(12) United States Patent  (10) Patent No.: US 7,855,833 B2
Harada et al.                (45) Date of Patent:     Dec. 21, 2010

(54) TRANSMISSION SCREEN

(75) Inventors: Masahiro Harada, Koshigaya (JP); Hideki Etori, Saitama (JP); Hirohide Nakata, Fuchu (JP)

(73) Assignee: Kimoto Co., Ltd., Tokyo (JP)

( * ) Notice: Subject to any disclaimer, the term of this patent is extended or adjusted under 35 U.S.C. 154(b) by 881 days.

(21) Appl. No.: 11/658,764

(22) PCT Filed: Aug. 8, 2005

(86) PCT No.: PCT/JP2005/014518

§ 371 (c)(1),
(2), (4) Date: Jan. 29, 2007

(87) PCT Pub. No.: WO2006/016556

PCT Pub. Date: Feb. 16, 2006

(65) Prior Publication Data

US 2009/0002817 A1    Jan. 1, 2009

(30) Foreign Application Priority Data

Aug. 10, 2004  (JP) .................. 2004-233255

(51) Int. Cl.
   *G03B 21/60*    (2006.01)
(52) U.S. Cl. ........................................ 359/453
(58) Field of Classification Search .......... 359/452–453
   See application file for complete search history.

(56) References Cited

U.S. PATENT DOCUMENTS

| 5,615,045 | A  | * | 3/1997 | Takuma et al. ............. 359/456 |
| 6,348,960 | B1 | * | 2/2002 | Etori et al. ................ 349/112 |
| 6,556,347 | B1 | * | 4/2003 | Murayama et al. ......... 359/453 |
| 6,859,314 | B2 | * | 2/2005 | Yoon et al. ................. 359/452 |
| 7,158,298 | B2 | * | 1/2007 | Miyata et al. .............. 359/453 |
| 2001/0005282 | A1 |  | 6/2001 | Etori et al. ................. 359/453 |

FOREIGN PATENT DOCUMENTS

| JP | 2000-235229 A | 8/2000 |
| JP | 2000-35180 A  | 11/2000 |
| JP | 2002-169227 A | 6/2002 |
| JP | 2005-4059 A   | 1/2005 |

* cited by examiner

*Primary Examiner*—Christopher Mahoney
(74) *Attorney, Agent, or Firm*—Bacon & Thomas PLLC

(57) ABSTRACT

A transmission screen through which an observer can see the side of the screen opposite to the observer side, and which has a sufficient viewing angle is provided. The transmission screen is a transmission screen 1 having a light diffusing layer 2 comprising a transparent binder and light diffusing elements contained in the binder, and the transmission screen is constituted so that the light diffusing elements should have a relative refractive index n of 0.75 or smaller or 1.25 or larger relative to refractive index of the transparent binder, both surfaces of the transmission screen 1 should be substantially smooth, and the transmission screen should have a total haze (JIS K7136:2000) of 10 to 85%.

20 Claims, 3 Drawing Sheets

TRANSMISSION SCREEN

BACKGROUND OF THE INVENTION

1. Field of the Invention

The present invention relates to a back projection type transmission screen, with which images projected from a projector can be recognized from the side of the screen opposite to the projector side. The present invention relates to a transmission screen utilizing a special light diffusing layer and thereby exhibiting a sufficient viewing angle and superior transparency, through which background can be seen (see-through property).

2. Background Art

Most of the conventionally and practically used transmission screens use polarization films, fresnel lens sheets, lenticular lens sheets and so forth in order to obtain high luminance and high contrast. However, these conventional transmission screens are expensive, and it is substantially impossible to see the other side of the screens, because they use polarization films or lens sheets.

In show windows of stores, advertising representations are employed by sticking up posters, spray painting and so forth. However, such advertising representations are static, and unless sticking posters or giving painting again, the content of the advertisement does not change. Therefore, it is conceivable to project dynamic advertisements on show windows etc. by using a projector or the like. However, show windows etc. are highly transparent, and therefore projected light is transmitted through them without forming images. If a conventional transmission screen is stuck up on a show window, it becomes possible to see images projected from the back side. However, since conventional transmission screens are not transparent, it becomes impossible to see commercial advertising from the outside, and thus the show window becomes meaningless.

As a means for solving this problem, a transmission screen using a special transparent light scattering layer has been proposed, through which things behind can be seen, in Japanese Patent Unexamined Publication (KOKAI) No. 2001-242546.

However, although the transmission screen of Japanese Patent Unexamined Publication No. 2001-242546 shows sufficient transparency, it does not have a sufficient viewing angle, and images cannot be clearly recognized from a direction deviated from the front direction.

SUMMARY OF THE INVENTION

Therefore, an object of the present invention is to provide a transmission screen through which an observer can see the side of the screen opposite to the observer side (see-through property), when the screen is stuck on a transparent body such as a show window or transparent windowpane, or used as the transparent body itself, and which has a sufficient viewing angle.

The transmission screen of the present invention is a transmission screen having a light diffusing layer comprising a transparent binder and light diffusing elements contained in the binder, wherein the light diffusing elements have a relative refractive index n relative to refractive index of the transparent binder (value obtained by dividing refractive index of the light diffusing elements with the refractive index of the transparent binder, henceforth also referred to as the ""relative refractive index"") of 0.75 or smaller or 1.25 or larger, both surfaces of the transmission screen are substantially smooth, and the transmission screen has a total haze (JIS K7136:2000) of 10 to 85%.

The expression ""substantially smooth"" referred to in the present invention means to have an arithmetical mean deviation (Ra) of 0.30 μm or less according to JIS B0601:2001.

The aforementioned relative refractive index is preferably 0.70 or smaller or 1.50 or larger. The aforementioned total haze is preferably 25 to 70%.

According to the present invention, there can also be provided a rear projection monitor utilizing the transmission screen. That is, there is provided a rear projection monitor comprising a projector for projecting images displayed on an image display apparatus, a reflection mirror for reflecting lights projected from the projector, and a transmission screen having a light incident surface and a light emergent surface for receiving lights reflected by the mirror with the light incident surface to form images, wherein the aforementioned transmission screen of the present invention is used as the transmission screen.

EFFECT OF THE INVENTION

The transmission screen of the present invention can simultaneously exhibit conflicting performances, that is, an excellent see-through property and wide viewing angle. When it is stuck up on a show window, commercial articles can be seen from the outside in that state, because the transmission screen of the present invention has an excellent see-through property, and it can provide marked advertising effect as a screen having a wide viewing angle without degrading the function of the show window.

The transmission screen of the present invention is a transmission screen having a light diffusing layer comprising a transparent binder and light diffusing elements contained in the binder, wherein the light diffusing elements have a relative refractive index n of 0.75 or smaller or 1.25 or larger relative to refractive index of the transparent binder, both surfaces of the transmission screen are substantially smooth, and the screen has a total haze (JIS K7136:2000) of 10 to 85%. Hereafter, embodiments of the elements constituting the screen will be explained.

BRIEF DESCRIPTION OF THE DRAWINGS

FIG. 7($b$) is a front view of the same rear projection monitor.

DESCRIPTION OF THE PREFERRED EMBODIMENTS

Figure 1:
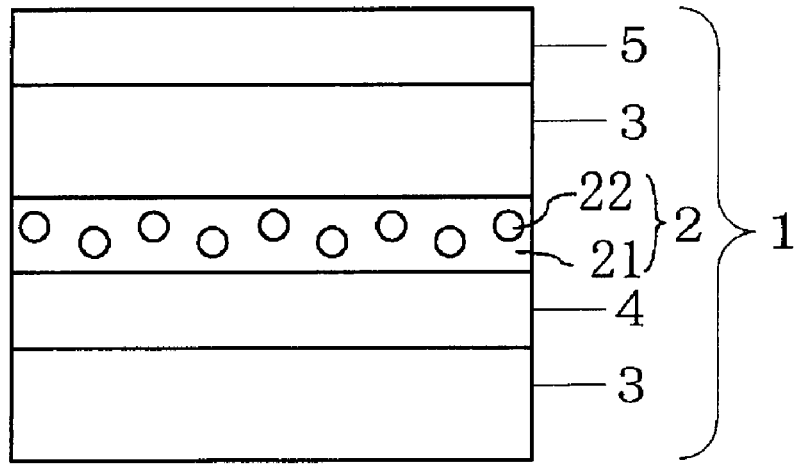
FIG. 1 is a sectional view showing a first embodiment of the transmission screen of present invention.

FIGS. 1 to 5 show sectional views of various embodiments of the transmission screen 1 of the present invention. As shown in the drawings, the transmission screen 1 of the present invention (henceforth also referred to as "screen") comprises a light diffusing layer 2 or a light diffusing layer 2a. The light diffusing layer 2 contains light diffusing elements 22 in a transparent binder 21. Although the light diffusing layer 2a also comprises the light diffusing elements 22 in the transparent binder 21, it uses a binder having adhesiveness as the transparent binder 21, and thus the light diffusing layer 2a itself has adhesiveness.

The transmission screen 1 according to the embodiment shown in FIG. 1 is provided with a transparent body 3 directly on one side of the light diffusing layer 2 (upper surface in FIG. 1), and another transparent body 3 via an adhesive layer 4 on another surface of the light diffusing layer 2 (lower surface in FIG. 1). In the transmission screen 1 shown in FIG. 1, a hard coat layer 5 is provided on the transparent body 3 of the upper surface side. The transmission screen 1 according to the embodiment shown in FIG. 2 has a configuration that transparent bodies 3 are provided on both surfaces of a light diffusing layer 2a having adhesiveness. The transmission screen 1 according to the embodiment shown in FIG. 3 has a configuration that a transparent body 3 is provided on one surface of a light diffusing layer 2, and an anti-reflection layer 6 is provided on the other surface. The transmission screen 1 according to the embodiment shown in FIG. 4 consists only of a single light diffusing layer 2 serving as the transmission screen 1. The transmission screen 1 according to the embodiment shown in FIG. 5 has a structure that a light diffusing layer 2 is provided with a transparent body 3 on only one surface.

As the transparent binder 21 of the light diffusing layer 2 or 2a, for example, glass or a polymer resin is used.

Although the glass is not particularly limited so long as glass not degrading see-through property of the light diffusing layer 2 is chosen, generally practical are oxidized glass such as silicate glass, phosphate glass and borate glass, and silicic acid glass, or silicate glass such as alkali silicate glass, soda lime glass, potash lime glass, lead glass, barium glass and borosilicate glass is especially preferred. When glass is used as the transparent binder, it is preferable to form plate glass from a raw material comprising, for example, lime and silicic acid as main components and containing the light diffusing elements 22, and polish surfaces of the glass to smoothen the surfaces and thereby form polished plate glass. By such a procedure, higher see-through property of the plate glass can be provided, and plate glass suitable for the present invention can be obtained.

The polymer resin is not particularly limited so long as a polymer resin not degrading the see-through property of the light diffusing layer 2 is chosen, and there can be used, for example, thermoplastic resins, thermosetting resins, ionizing radiation curable resins and so forth such as polyester type resins, acrylic type resins, acrylic urethane type resins, polyester acrylate type resins, polyurethane acrylate type resins, epoxy acrylate type resins, urethane type resins, epoxy type resins, polycarbonate type resins, cellulose type resins, acetal type resins, vinyl type resins, polyethylene type resins, polystyrene type resins, polypropylene type resins, polyamide type resins, polyimide type resins, melamine type resins, phenol type resins, silicone type resins and fluorocarbon type resins. These polymers resins can be melted, added with the light diffusing elements 22, made into a sheet to form the light diffusing layer 2, and used to form the screen 1 having, for example, the structure shown in FIG. 4. Alternatively, a paint formed from a polymer resin together with the light diffusing elements 22 can be coated on a transparent body 3 to form a film and thereby form the screen 1 having, for example, the structure shown in FIG. 5.

Figure 2:
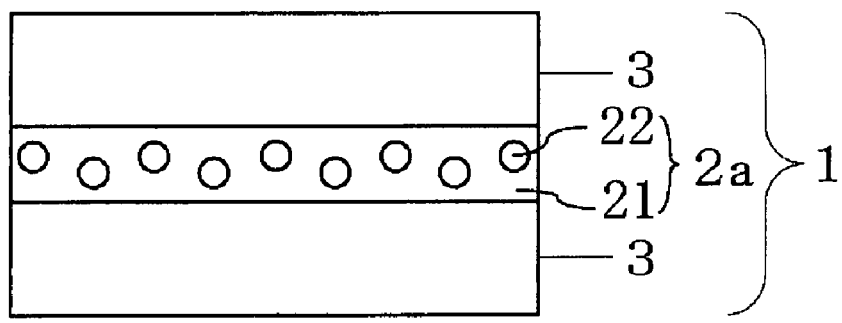
FIG. 2 is a sectional view showing a second_embodiment of the transmission screen of present invention.

By using a polymer resin having adhesiveness as the transparent binder 21, a light diffusing layer 2a having adhesiveness can be obtained (FIG. 2). If the light diffusing layer 2a has adhesiveness, the screen can be easily stuck up on a desired transparent body such as show windows. As the polymer resin having adhesiveness, there can be used known adhesives, for example, synthetic resins such as acrylic type resins, epoxy type resins, ethylene/vinyl acetate type resins, polyvinyl ether type resins, polyvinyl acetal type resins, cellulose type resins, polyester type resins, polyurethane type resins, polyamide type resins, polyolefin type resins, phenol type resins, and cyanoacrylate type resins, rubber type resins such as those of natural rubber type, reclaimed rubber type, polychloroprene rubber type, nitrile rubber type, and styrene/butadiene rubber type, and so forth, so long as an adhesive not degrading the transparency is chosen.

The light diffusing elements 22 to be contained in the transparent binder 21 are suitably selected and used depending on the type of the transparent binder 21. That is, the light diffusing elements 22 can be selected depending on the type of the transparent binder 21 so that the relative refractive index n of the light diffusing elements 22 relative to the refractive index of the transparent binder 21 should become 0.75 or smaller or 1.25 or larger. Because the glass and polymer resins used as the transparent binder 21 have a refractive index of 1.3 to about 1.7, the followings can be mentioned as examples of the light diffusing elements 22.

When the relative refractive index is made to be 0.75 or smaller, examples of the light diffusing elements 22 include gases such as air, oxygen and nitrogen. Examples of means for incorporating these gases into the transparent binder 21 include, for example, generating bubbles in the transparent binder 21 by using a foaming agent at the time of the film formation of the light diffusing layer 2 or 2a, and incorporating hollow beads enclosing gas as the light diffusing elements 22 in the inside (henceforth also referred to as "hollow beads") into the transparent binder 21. Among these, the hollow beads are preferably used, because they can stably incorporate the light diffusing elements 22 into the transparent binder 21.

When the relative refractive index is made to be 1.25 or larger, examples of the light diffusing elements 22 include highly refractive particles such as those of titanium oxide, zinc oxide, tin oxide, zirconium oxide, cerium oxide, lead oxide and indium oxide. Among these, preferably used are titanium oxide particles, which are inexpensive and of which handling is easy.

The light diffusing elements 22 have a mean particle diameter (when it is gas, average of diameters of bubbles or gaseous portions in the hollow beads) of about 0.1 to 40 μm. The mean particle diameter is preferably smaller than the thickness of the light diffusing layer, in order to obtain smooth surfaces as both the surfaces of the light diffusing layer 2 or 2a.

The content of the light diffusing elements 22 in the light diffusing layer 2 or 2a cannot be generally defined, because it varies depending on type of the light diffusing elements 22 to be used, thickness of the light diffusing layer 2 or 2a, and so forth. However, when the light diffusing elements 22 consist of particles or hollow beads, the content is preferably 0.05 to 30% by weight. Moreover, irrespective of the type of the light diffusing elements 22 (including gases), the content is preferably 0.05 to 15% by volume. By incorporating the light diffusing elements 22 in such ranges, the total haze of the transmission screen 1 can be adjusted to be within the range of 10 to 85%.

For the transmission screen 1 of the present invention utilizing the same combination of the binder resin 21 and the light diffusing elements 22 in the aforementioned light diffusing layer 2 or 2a, if the mean particle diameter of the light diffusing elements 22 is in an appropriate range, the viewing angle can be maintained to be within a certain range irrespective of the size of the mean particle diameter by adjusting the haze to be a certain level. Because the haze can be adjusted by changing the amount of the light diffusing elements 22 or the thickness of the light diffusing layer 2 or 2a, the range of the viewing angle, an optical characteristic of the transmission screen 1 of the present invention, can be easily made to be within a desired range. Because of this characteristic, the viewing angle can be maintained to be within a certain range by monitoring the haze in the production process, and thus process control can be easily attained.

Figure 3:
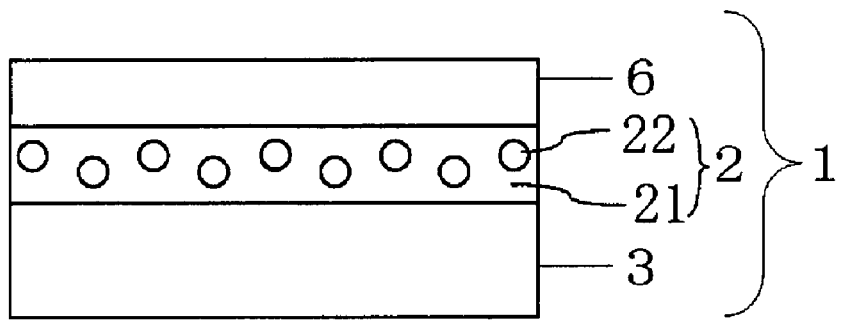
FIG. 3 is a sectional view of a third embodiment of the transmission screen of present invention.
Figure 4:
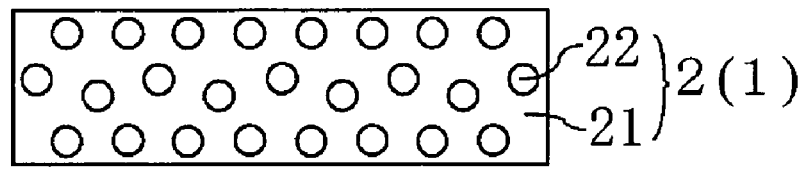
FIG. 4 is a sectional view of a fourth embodiment of the transmission screen of present invention.
Figure 5:
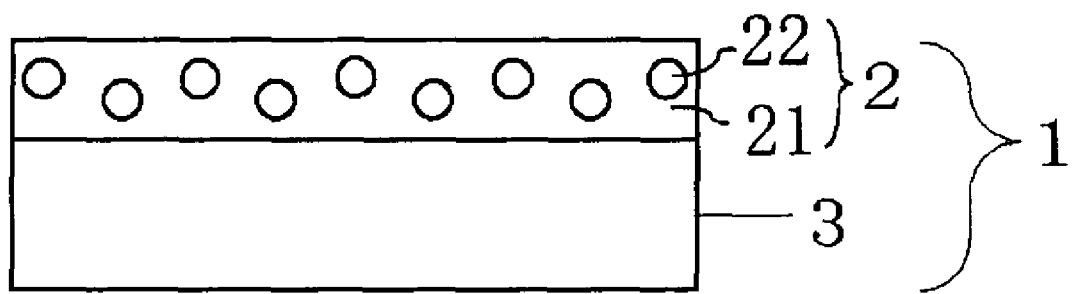
FIG. 5 is a sectional view of a fifth embodiment of the transmission screen of present invention.

In addition, in order to obtain substantially smooth surfaces of the transmission screen 1 of the present invention, the screen 1 may have a configuration that both surfaces of the light diffusing layer 2 or 2a have other layers having a substantially smooth surface (transparent body 3, hard coat layer 5, anti-reflection layer 6 etc.) as in the transmission screens 1 shown in FIGS. 1, 2 and 3. In this configuration, even if the light diffusing elements 22 protrude from the surfaces of the light diffusing layer 2, the surfaces of the transmission screen 1 are made substantially smooth by the other layers (transparent body 3, adhesive layer 4, anti-reflection layer 6 etc.) provided on both surfaces of the light diffusing layer 2. On the other hand, when the transmission screen 1 consists of a single layer of the light diffusing layer 2 or 2a, and both the surfaces are exposed like the transmission screen 1 shown in FIG. 4, or when the screen has such a structure that no other layer is provided on one surface of the light diffusing layer 2 or 2a, and the one surface is exposed as shown in FIG. 5, the surface or surfaces of the light diffusing layer 2 or 2a serve as the surface or surfaces of the transmission screen 1. Therefore, if the light diffusing elements 22 protrude, the surface or surfaces of the transmission screen 1 can no longer be smooth. For such a structure, the surfaces of the light diffusing layer 2 or 2a can be made substantially smooth by once placing other substantially smooth layers on both surfaces of the light diffusing layer 2 or 2a to press the light diffusing elements 22 protruding from the surfaces of the light diffusing layer 2 or 2a with the other layers in the production process of the transmission screen 1. Then, the other layers are removed in a subsequent production step or upon use to obtain the structure of FIGS. 4 and 5. Both the surfaces of the transmission screen can be thereby made substantially smooth. However, the method of preventing the light diffusing elements 22 from protruding from the surfaces of the light diffusing layer 2 or 2a is not limited to the above method, and a method of polishing or chemically etching the surfaces of the light diffusing layer 2 or 2a and so forth can also be used.

Examples of the other layers provided on the light diffusing layer 2 or 2a include, besides the transparent body 3, an anti-reflection layer and a hard coat layer, for example. FIG. 3 shows the screen 1 having the anti-reflection layer 6 on one surface of the light diffusing layer 2 and the transparent body 3 on the other surface. Such a screen 1 can be obtained by, for example, providing the light diffusing layer 2 on a polymer resin sheet 3 and providing the anti-reflection layer 6 on the light diffusing layer 2.

The anti-reflection layer 6 is a layer for compensating reflection of lights utilizing interference of lights at a layer interface, and a known anti-reflection layer can be used. Specific examples include a highly transparent low refractive index layer such as silicon oxide or lithium fluoride layer made in an optical film thickness corresponding to one fourth of the major wavelength of lights as the target of anti-reflection.

The hard coat layer is a layer for preventing scratches of surfaces, and it can be formed from, for example, a curable resin such as ionizing radiation curing resins and thermosetting resins.

As the transparent body 3 to be provided on the light diffusing layer 2 or 2a, plate glass made of a glass material or a polymer resin made into a sheet can be used, wherein the glass material and the polymer resin are selected from those mentioned above as examples of the transparent binder 21 of the light diffusing layer 2 or 2a.

Such a transparent body 3 as described above serves as a substrate at the time of film formation of the light diffusing layer using a paint formed from the polymer resin 21 together with the light diffusing elements 22. Further, on the light diffusing layer 2 or 2a formed on the transparent body 3, another transparent body 3 may also be laminated directly or via a transparent adhesive layer or tacky layer. On the surface of the transparent body opposite to the surface on which the light diffusing layer is disposed, an anti-reflection layer, a hard coat layer or the like may be provided. FIGS. 1 and 2 show examples of the screen in which the light diffusing layer 2 or 2a has the transparent bodies 3 on both sides.

The screen 1 having the structure shown in FIG. 1 can be obtained by, for example, putting the light diffusing layer 2 between the polymer resin sheet (transparent body) 3 and show window glass (transparent body) 3 using an adhesive layer 4 or the like. The screen 1 shown in FIG. 1 has a hard coat layer 5 on the surface of the polymer resin sheet (transparent body) 3 opposite to the surface having the light diffusing layer 2. As the tacky layer 4 or adhesive layer, there can be used known adhesives or tackifiers, for example, synthetic resins such as acrylic type resins, epoxy type resins, ethylene/vinyl acetate type resins, polyvinyl ether type resins, polyvinyl acetal type resins, cellulose type resins, polyester type resins, polyurethane type resins, polyamide type resins, polyolefin type resins, phenol type resins, and cyanoacrylate type resins, rubber type resins such as those of natural rubber type, reclaimed rubber type, polychloroprene rubber type, nitrile rubber type, and styrene/butadiene rubber type, and so forth, so long as a material not degrading the transparency is chosen. Further, the screen 1 having the structure shown in FIG. 2 can be obtained by adhering a sheet comprising a polymer resin sheet (transparent body) 3 on which an adhesive light diffusing layer 2a is provided on show window glass (transparent body) 3.

The transmission screen of the present invention comprises the aforementioned light diffusing layer 2 or diffusing layer 2a having adhesiveness, and it is made so that the light diffusing elements should have a relative refractive index n relative to refractive index of the transparent binder of 0.75 or smaller or 1.25 or larger, preferably 0.70 or smaller or 1.50 or larger. Further, both surfaces of the transmission screen are substantially smooth, and the screen has a total haze (JIS K7136:2000) of 10 to 85%, preferably 25 to 70%. The expression "substantially smooth" referred to herein means to have an arithmetical mean deviation (Ra) of 0.30 μm or less, preferably 0.15 μm or less, according to JIS B0601:2001.

The transmission screen of the present invention having a relative refractive index in the aforementioned range, substantially smooth surfaces for the both surfaces and a total haze of 10 to 85% as described above can have sufficient see-through property and sufficient viewing angle. These three of requirements (relative refractive index, smoothness, haze) are essential requirements for obtaining the effect of the present invention, and if even one of these requirements is not satisfied, sufficient see-through property and viewing angle cannot be obtained.

The relative refractive index is a parameter representing easiness of refracting lights, and as the relative refractive index more deviates from 1, the material refracts lights in a larger degree, and therefore it becomes easier to widen the viewing angle. In the present invention, since the relative refractive index is defined to be 0.75 or smaller or 1.25 or larger, a transmission screen having a large viewing angle and high see-through property can be realized. The relative refractive index range of 0.75 or smaller is preferably 0.70 or smaller. The relative refractive index range of 1.25 or larger is preferably 1.50 or larger. Even if the relative refractive index is larger than 0.75 and smaller than 1.25, the viewing angle can be widened by increasing the addition amount of the particles and thereby markedly increasing the haze. However, it invites an unduly large content of the particles and an unduly high haze, and thus see-through property becomes insufficient. Therefore, if the relative refractive index is out of the aforementioned range, sufficient viewing angle and see-through property cannot be obtained, even if the remaining two of the requirements are fulfilled.

The haze is a parameter representing degree of scattering lights. If the haze is made higher, the viewing angle is widened, but the see-through property is degraded. Conversely, if the haze is made lower, the viewing angle becomes narrower, but the see-through property is improved. In the present invention, the total haze of the transmission screen is defined to be 10 to 85%, preferably 25 to 70%. When the total haze of the transmission screen is smaller than 10%, a sufficient viewing angle cannot be obtained, even if remaining two of the requirements are fulfilled. When the haze exceeds 85%, sufficient see-through property cannot be obtained, even if remaining two of the requirements are fulfilled. The total haze referred to here is the sum of the internal haze (haze resulting from the relative refractive index) and the external haze (haze originated in surface convexes and concaves).

Further, the requirement that both the surfaces of the transmission screen should be substantially smooth means that there is substantially no external haze (surface scattering). Since the scattering due to the external haze causes significant turbulence in lights for the light advancing direction after the scattering relative to the lights before the scattering, it degrades the see-through property. In contrast, lights scattered due to the internal haze highly maintain the order of lights for the light advancing direction, and therefore high see-through property is maintained, even if there is scattering due to the internal haze. Therefore, in the present invention, substantially smooth surfaces are used for both the surfaces of the transmission screen to substantially eliminate the external haze and thereby enhance the see-through property.

The transmission screen of the present invention preferably has a total light transmission (JIS K7361-1:1997) of 70% or higher.

Further, the transmission screen of the present invention preferably has a distinctness of image of transmission (JIS K7105:1981) of 50% or more, more preferably 60% or more. The distinctness of image of transmission is a value calculated in accordance with the following equation (1) using the maximum wave height [M] and the minimum wave height [m] read with an optical comb width of 2.0 mm by the transmission method.

$$\text{Distinctness of image of transmission}[C_{(2.0)}] = \{M-m\}/\{M+m\} \times 100(\%) \quad (1)$$

The distinctness of image of transmission serves as an index of see-through property. If it is 50% or higher, the screen shows favorable see-through property at the time of being projected or not projected with images, and the background can be seen through the transmission screen. A distinctness of image of transmission of 50% or more can be obtained by choosing the smoothness and the haze, among three of the requirements, relative refractive index, smoothness and haze, to be within the aforementioned ranges.

Figure 6:
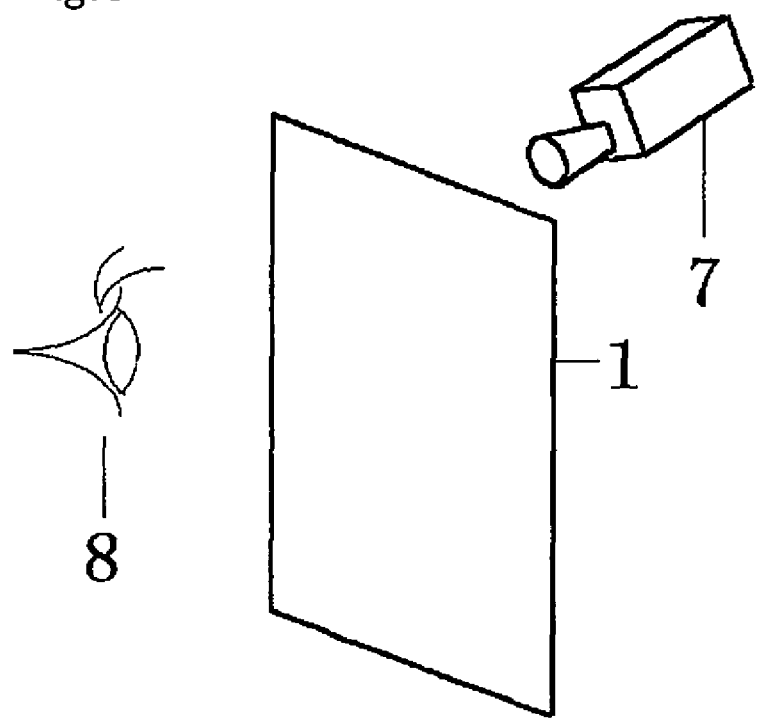
FIG. 6 is a schematic view illustrating use of the transmission screen of present invention.

When the transmission screen 1 of the present invention is used, it is disposed between a projector 7 and an observer 8 as shown in FIG. 6. The surface on the side of the observer 8 is preferably provided with the anti-reflection layer mentioned above, in order to prevent reflection of lights of fluorescent lamp etc.

The aforementioned light diffusing layer and anti-reflection layer may contain additives, for example, colorants such as dyes and pigments, leveling agents, ultraviolet absorbers, anti-oxidants and so forth in such a degree that the aforementioned performances should not be degraded.

Hereafter, the rear projection monitor utilizing the transmission screen of the present invention will be explained. A rear projection monitor is an apparatus for projecting images displayed on an image display apparatus such as liquid crystal panels and CRTs displaying images of personal computers and televisions on a transmission screen from a projector via a reflection mirror. Because the rear projection monitor of the present invention utilizes the transmission screen 1 showing a wide viewing angle and high see-through property, it is suitable for the purpose of projecting images on window members of show windows.

The rear projection monitor of the present invention may be one provided with a projector, a reflection mirror and a transmission screen, which elements are arranged in a sense of geometrical optics so that images should be formed on the transmission screen. It may comprise one or more reflection mirrors.

Figure 7:
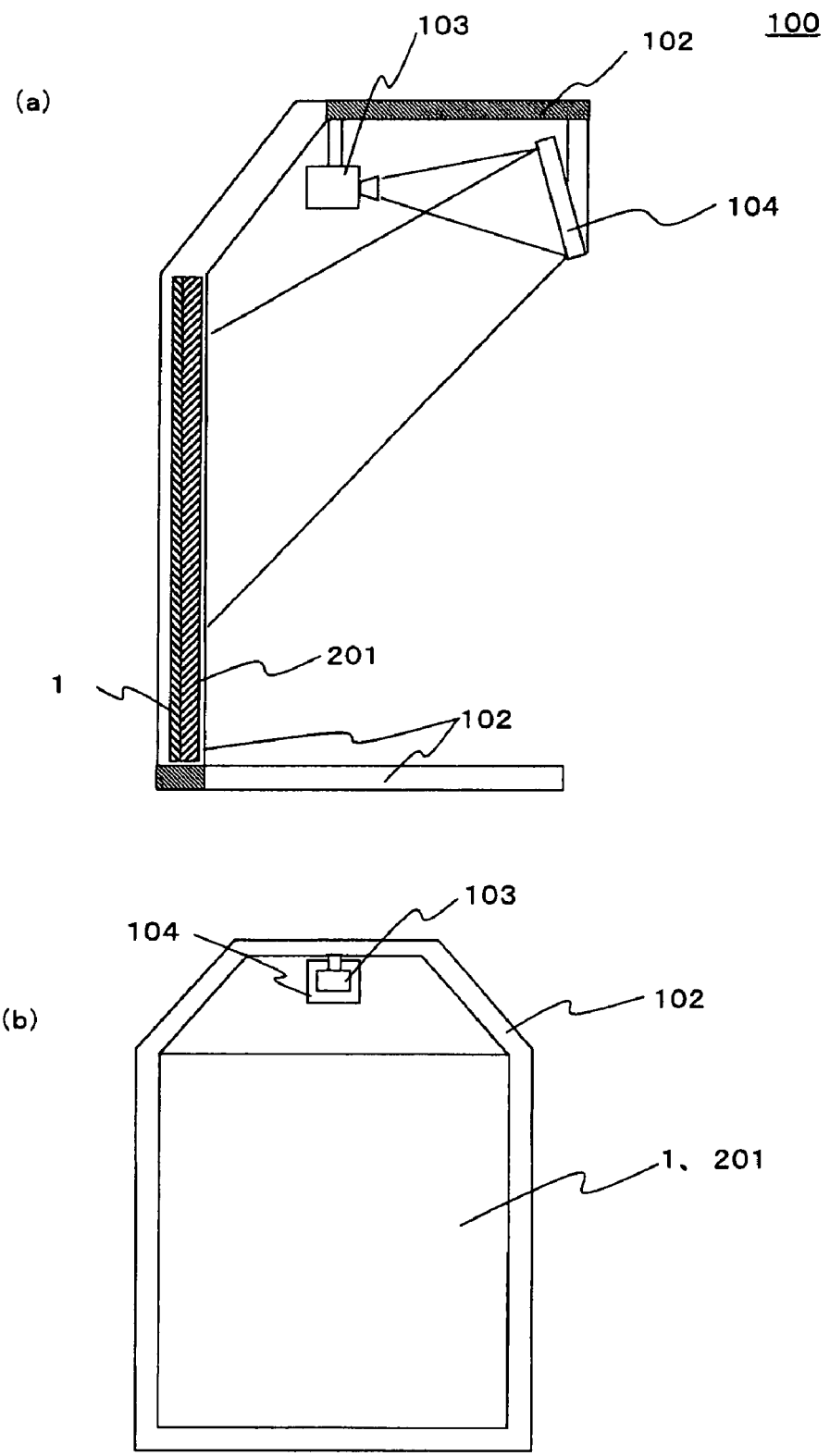
FIG. 7($a$) is a sectional view of a rear projection monitor utilizing the transmission screen of the present invention.

A sectional view and a front view of an embodiment of the rear projection monitor 100 to which the present invention is applied are shown in FIGS. 7 (a) and (b), respectively. The rear projection monitor 100 comprises a transparent body 201 constituting a window and consisting of an acrylic panel or the like, and the transparent body 201 can be used as a part of window members of a show window. Further, it can also be used so that the transparent body 201 shown in FIGS. 7 (a) and (b) should be disposed in the vicinity of window members of a show window. The structure of the rear projection monitor 100 will be explained with reference to FIGS. 7 (a) and (b). The rear projection monitor 100 is provided with a transmission screen 1, a transparent body 201, a frame 102 for supporting the screen 1 and the transparent body 201, a projector 103 disposed at an upper part of the frame 102, and a mirror 104 for reflecting lights projected from the projector 103.

As the transmission screen 1, the transmission screen of the present invention such as those shown in FIGS. 1 to 5 is used. The transmission screen 1 is stuck on the front surface of the transparent body 201 with an adhesive or the like. When the transmission screen 1 of FIG. 1, 2, 3 or 5 is used, it is also possible to use the transparent body 201 as the transparent body 3 constituting the transmission screen 1 so that the transparent body 201 should be a part of the transmission screen 1.

The mirror 104 is fixed at an upper part of the frame 102 so that it should form a predetermined angle with respect to the screen 1. The mirror 104 is fixed at such an angle that lights projected from the projector 103 should be reflected by the mirror 104 and projected on the back face of the screen 1.

In such a structure as described above, the lights projected from the projector 103 are reflected by the mirror 104 and then form images on the transmission screen 1. Because the transmission screen 1 of the present invention exhibits a wide viewing angle and high see-through property, the images projected on the transmission screen 101 can be seen even from an oblique direction, and at the same time, commercial articles placed behind the transmission screen 1 can be seen. Although the transmission screen 1 is disposed on the front side of the transparent body 201 in FIG. 7 (*a*), it may also be disposed on the back side. Moreover, although the rear projection monitor 100 shown in FIGS. 7 (*a*) and (*b*) is provided with the frame 102, the transmission screen 1 may also be directly attached to a window member of a show window, and the projector 103 and the mirror 104 may be fixed on the ceiling of the show window. In such a case, the frame 102 becomes unnecessary.

EXAMPLES

Hereafter, the present invention will be further explained with reference to examples. The term and symbol "part" and "%" are used on weight basis, unless specifically indicated.

Example 1

On one surface of a polyethylene terephthalate film having a thickness of 100 μm (Lumirror T-60, Toray Industries, Inc.), a coating solution [a] for adhesive light diffusing layer having the following composition was applied and dried to form an adhesive light diffusing layer having a thickness of 40 μm. Then, the same polyethylene terephthalate film as that mentioned above was adhered on the adhesive light diffusing layer to obtain a transmission screen of Example 1. The refractive index of the transparent binder in the adhesive light diffusing layer was 1.50.

| <Coating solution [a] for adhesive light diffusing layer> | |
|---|---|
| Urethane type adhesive (Takelac A-971, Takeda Pharmaceutical Co. Ltd., solid content: 50%) | 50 parts |
| Isocyanate curing agent (Takenate A-3, Takeda Pharmaceutical Co. Ltd., solid content: 75%) | 1.5 parts |
| Hollow beads (HSC-110, Potters-Ballotini Co., Ltd., refractive index of gaseous portions: 1.0, mean diameter of gaseous portions: 5.5 μm) | 2 parts |
| Ethyl acetate | 5 parts |
| Toluene | 5 parts |

Example 2

A transmission screen of Example 2 was obtained in the same manner as that of Example 1 except that the addition amount of the hollow beads in the coating solution [a] for adhesive light diffusing layer used in Example 1 was changed to 0.5 part, and the thickness of the adhesive light diffusing layer was changed to 20 μm.

Example 3

A transmission screen of Example 3 was obtained in the same manner as that of Example 1 except that the addition amount of the hollow beads in the coating solution [a] for adhesive light diffusing layer used in Example 1 was changed to 8 parts, and the thickness of the adhesive light diffusing layer was changed to 45 μm.

Example 4

On one surface of a polyethylene terephthalate film having a thickness of 100 μm (Lumirror T-60, Toray Industries, Inc.), a coating solution [b] for light diffusing layer having the following composition was applied and dried to form a light diffusing layer having a thickness of 45 μm. The refractive index of the transparent binder in the light diffusing layer was 1.56. Then, a coating solution [c] for adhesive layer having the following composition was applied on the light diffusing layer and dried to form an adhesive layer having a thickness of 10 μm. Then, the same polyethylene terephthalate film as that mentioned above was adhered on the adhesive layer to obtain a transmission screen of Example 4.

| <Coating solution [b] for light diffusing layer> | |
|---|---|
| Polyester resin (Kemit 1249, Toray Industries, Inc., solid content: 100%) | 25 parts |
| Titanium oxide (KA-20, Titan Kogyo K.K., refractive index: 2.52, mean particle size: 0.4 μm) | 0.15 part |
| Ethyl acetate | 5 parts |
| Toluene | 5 parts |
| <Coating solution [c] for adhesive layer> | |
| Acrylic adhesive (Oribain BPS1109, TOYO INK MFG. CO., LTD., solid content: 40%) | 100 parts |
| Isocyanate curing agent (Oribain BHS8515, TOYO INK MFG. CO., LTD., solid content: 38%) | 2.4 parts |
| Ethyl acetate | 100 parts |

Example 5

A transmission screen of Example 5 was obtained in the same manner as that of Example 4 except that the addition amount of titanium oxide in the coating solution [b] for light diffusing layer used in Example 4 was changed to 0.07 part.

Example 6

A transmission screen of Example 6 was obtained in the same manner as that of Example 4 except that the addition amount of titanium oxide in the coating solution [b] for light diffusing layer used in Example 4 was changed to 0.25 part, and the thickness of the light diffusing layer was changed to 40 μm.

Comparative Example 1

A transmission screen of Comparative Example 1 was obtained in the same manner as that of Example 1 except that the hollow beads in the coating solution [a] for adhesive light diffusing layer used in Example 1 were changed to silicone resin beads (Tospearl 120, GE Toshiba Silicones Co., Ltd., refractive index: 1.44, mean particle size of 2 μm), the addition amount of the beads was changed to 2.5 parts, and the thickness of the adhesive light diffusing layer was changed to 30 μm.

Comparative Example 2

A transmission screen of Comparative Example 2 was obtained in the same manner as that of Example 1 except that the hollow beads in the coating solution [a] for adhesive light diffusing layer used in Example 1 were changed to silicone resin beads (Tospearl 120, GE Toshiba Silicones Co., Ltd., refractive index: 1.44, mean particle size of 2 μm), the addition amount of the beads was changed to 20 parts, and the thickness of the adhesive light diffusing layer was changed to 30 μm.

Comparative Example 3

On one surface of a polyethylene terephthalate film having a thickness of 100 μm (Lumirror T-60, Toray Industries, Inc.), an adhesive light diffusing layer was formed in the same manner as that of Example 1. Then, a hard coat film (KB Film N30, Kimoto Co., Ltd.) comprising a polyethylene terephthalate film having a hard coat layer on one surface was adhered on the adhesive light diffusing layer so that the hard coat layer should be on the surface side to obtain a transmission screen of Comparative Example 3.

Comparative Example 4

On one surface of a polyethylene terephthalate film having a thickness of 100 μm (Lumirror T-60, Toray Industries, Inc.), a coating solution [d] for light diffusing layer having the following composition was applied and dried to form a light diffusing layer having a thickness of 25 μm to obtain a transmission screen of Comparative Example 4. The refractive index of the transparent binder in the light diffusing layer was 1.56.

| <Coating solution [d] for light diffusing layer> | |
|---|---|
| Polyester resin (Kemit 1249, Toray Industries, Inc., solid content: 100%) | 27 parts |
| Hollow beads (HSC-110, Potters-Ballotini Co., Ltd., refractive index of gaseous portions: 1.0, mean diameter of gaseous portions: 5.5 μm) | 2 parts |
| Ethyl acetate | 5 parts |
| Toluene | 5 parts |

Comparative Example 5

A transmission screen of Comparative Example 5 was obtained in the same manner as that of Example 1 except that the addition amount of the hollow beads in the coating solution [a] for adhesive light diffusing layer used in Example 1 was changed to 0.1 part, and the thickness of the adhesive light diffusing layer was changed to 15 μm.

Comparative Example 6

A transmission screen of Comparative Example 6 was obtained in the same manner as that of Example 1 except that the addition amount of the hollow beads in the coating solution [a] for adhesive light diffusing layer used in Example 1 was changed to 12 parts, and the thickness of the adhesive light diffusing layer was changed to 45 μm.

Comparative Example 7

A transmission screen of Comparative Example 7 was obtained in the same manner as that of Example 4 except that the addition amount of titanium oxide in the coating solution [b] for light diffusing layer used in Example 4 was changed to 0.01 part, and the thickness of the light diffusing layer was changed to 15 μm.

Comparative Example 8

A transmission screen of Comparative Example 8 was obtained in the same manner as that of Example 4 except that the addition amount of titanium oxide in the coating solution b for light diffusing layer used in Example 4 was changed to 0.5 part, and the thickness of the light diffusing layer was changed to 45 μm.

Values of "relative refractive index", "arithmetical mean deviation" of both surfaces and "haze" of the transmission screens obtained in Examples 1 to 6 and Comparative Examples 1 to 8 are shown in Table 1. As for the arithmetical mean deviation of the screens of Comparative Examples 3 and 4, the numerical values on the right side represent arithmetical mean deviation values of the hard coat layer and light diffusing layer. Moreover, for the screens of Comparative Examples 3 and 4, haze was measured with lights incident from the hard coat layer or light diffusing layer side.

TABLE 1

|  | Relative Refractive Index | Arithmetical Mean Deviation (μm) | Haze (%) |
|---|---|---|---|
| Example 1 | 0.67 | 0.10/0.11 | 32.6 |
| Example 2 | 0.67 | 0.11/0.11 | 16.3 |
| Example 3 | 0.67 | 0.10/0.12 | 65.5 |
| Example 4 | 1.62 | 0.09/0.10 | 39.1 |
| Example 5 | 1.62 | 0.12/0.09 | 15.3 |
| Example 6 | 1.62 | 0.09/0.11 | 82.7 |
| Comp. Example 1 | 0.96 | 0.11/0.09 | 41.0 |
| Comp. Example 2 | 0.96 | 0.10/0.12 | 90.4 |
| Comp. Example 3 | 0.67 | 0.10/0.44 | 59.8 |
| Comp. Example 4 | 0.67 | 0.11/1.30 | 23.0 |
| Comp. Example 5 | 0.67 | 0.12/0.10 | 6.0 |
| Comp. Example 6 | 0.67 | 0.11/0.11 | 88.3 |
| Comp. Example 7 | 1.62 | 0.10/0.99 | 8.2 |
| Comp. Example 8 | 1.62 | 0.09/0.10 | 90.5 |

The transmission screens obtained in Examples 1 to 6 and Comparative Examples 1 to 8 were evaluated for the following items. The results are shown in Table 2.

(1) See-Through Property

Distinctness of image of transmission (%) was measured with an optical comb width of 2.0 mm according to JIS K7105:1981 by using a distinctness-of-image meter (ICM-1DP, Suga Test Instruments Co., Ltd.). For the screens of Comparative Examples 3 and 4, the measurement was performed with lights incident from the hard coat layer or light diffusing layer side.

(2) Viewing Angle

On the transmission screens of Examples 1 to 6 and Comparative Examples 1 to 8, a entirely white picture was projected by an LCD projector (ELP-8100, Seiko Epson Corporation) from a distance of 1 m, and luminance (cd/m$^2$) was measured for directions deviated by 30 degrees, 45 degrees and 60 degrees from the front direction by using a luminance meter (BM-7, TOPCON CORP.). For the screens of Comparative Examples 3 and 4, the luminance measurement was performed with lights incident from the hard coat layer or light diffusing layer side.

TABLE 2

| | Distinctness of Image of Transmission (%) | Luminance (cd/m²) | | |
| --- | --- | --- | --- | --- |
| | | 30 degree | 45 degree | 60 degree |
| Example 1 | 77.3 | 304 | 220 | 205 |
| Example 2 | 87.2 | 245 | 172 | 168 |
| Example 3 | 63.1 | 1009 | 737 | 672 |
| Example 4 | 91.9 | 972 | 582 | 508 |
| Example 5 | 91.7 | 363 | 168 | 160 |
| Example 6 | 90.7 | 1514 | 1166 | 1014 |
| Comp. Example 1 | 87.4 | 198 | 62 | 45 |
| Comp. Example 2 | 46.7 | 1899 | 509 | 248 |
| Comp. Example 3 | 28.7 | 350 | 286 | 169 |
| Comp. Example 4 | 43.7 | 243 | 116 | 122 |
| Comp. Example 5 | 92.3 | 161 | 40 | 38 |
| Comp. Example 6 | 32.2 | 1336 | 904 | 835 |
| Comp. Example 7 | 92.0 | 254 | 81 | 57 |
| Comp. Example 8 | 48.7 | 1742 | 1224 | 1108 |

As clearly seen from the above results, the transmission screens of Examples 1 to 6 all satisfied three of the requirements concerning relative refractive index, smoothness and haze, and therefore all of them had sufficient see-through property as demonstrated by distinctness of image of transmission more than 50% and a sufficient viewing angle as demonstrated by luminance more than 100 cd/m² for the viewing angles of 45 degrees and 60 degrees.

On the other hand, since all the transmission screens of the comparative examples did not satisfy one or more of the three requirements concerning relative refractive index, smoothness and haze, they were insufficient in either one of see-through property or viewing angle.

The transmission screen of Comparative Example 1 did not satisfy the requirement of relative refractive index, and therefore it showed poor viewing angle as demonstrated by luminance lower than 100 cd/m² for the viewing angles of 45 degrees and 60 degrees.

The transmission screen of Comparative Example 2 did not satisfy the requirement of relative refractive index like that of Comparative Example 1, but sufficient viewing angle was secured by increasing the haze. However, since the haze was unduly high, it showed poor see-through property as shown by the distinctness of image lower than 50%.

The transmission screens of Comparative Examples 3 and 4 had a non-smooth surface as one of the surfaces. Therefore, they showed poor see-through property as shown by the distinctness of image lower than 50%.

The transmission screens of Comparative Examples 5 and 7 had an unduly low haze, and therefore they showed poor viewing angle as shown by the luminance lower than 100 cd/m² for the viewing angles of 45 degrees and 60 degrees.

The transmission screens of Comparative Examples 6 and 8 had an unduly high haze, and therefore they showed poor see-through property as shown by the distinctness of image lower than 50%.

The invention claimed is:

1. A transmission screen comprising:
a light diffusing layer comprising a transparent binder and light diffusing elements contained within the binder,
wherein the light diffusing layer has opposing, substantially smooth surfaces, without the light diffusing elements protruding therefrom,
wherein the light diffusing elements have a relative refractive index n of 0.75 or smaller or 1.25 or larger relative to refractive index of the transparent binder,
wherein both surfaces of the transmission screen are substantially smooth, and
wherein the transmission screen has a total haze (JIS K7136:2000) of 10 to 85%.

2. The transmission screen according to claim 1, wherein the relative refractive index is 0.70 or smaller or 1.50 or larger.

3. The transmission screen according to claim 2, wherein both surfaces of the transmission screen have an arithmetical mean deviation (JIS B0601:2001) of 0.30 or less.

4. The transmission screen according to claim 2, wherein the total haze is 25 to 70%.

5. A rear projection monitor comprising a projector for projecting images displayed on an image display apparatus, a reflection mirror for reflecting lights projected from the projector, and a transmission screen having a light incident surface and a light emergent surface for receiving lights reflected by the mirror with the light incident surface to form images,
wherein the transmission screen according to claim 2 is used as the transmission screen.

6. The transmission screen according to claim 1, wherein the relative refractive index n of the light diffusing elements is 0.75 or smaller.

7. The transmission screen according to claim 6, wherein the light diffusing elements are gas bubbles.

8. The transmission screen according to claim 6, wherein the light diffusing elements are hollow beads.

9. The transmission screen according to claim 1, wherein the relative refractive index n of the light diffusing elements is 0.70 or smaller.

10. The transmission screen according to claim 1, wherein the relative refractive index n of the light diffusing elements is 1.25 or larger.

11. The transmission screen according to claim 10, wherein the light diffusing elements are refractive particles.

12. The transmission screen according to claim 11, wherein the refractive particles are selected from the group consisting of titanium oxide, zinc oxide, tin oxide, zirconium oxide, cerium oxide, lead oxide and indium oxide.

13. The transmission screen according to claim 11, wherein the refractive particles are titanium oxide.

14. The transmission screen according to claim 1, wherein the relative refractive index n of the light diffusing elements is 1.5 or larger.

15. The transmission screen according to claim 1, wherein both surfaces of the transmission screen have an arithmetical mean deviation (JIS B0601:2001) of 0.30 or less.

16. The transmission screen according to claim 15, wherein the total haze is 25 to 70%.

17. A rear projection monitor comprising a projector for projecting images displayed on an image display apparatus, a reflection mirror for reflecting lights projected from the projector, and a transmission screen having a light incident surface and a light emergent surface for receiving lights reflected by the mirror with the light incident surface to form images,
wherein the transmission screen according to claim 15 is used as the transmission screen.

18. The transmission screen according to claim 1, wherein the total haze is 25 to 70%.

19. A rear projection monitor comprising a projector for projecting images displayed on an image display apparatus, a reflection mirror for reflecting lights projected from the projector, and a transmission screen having a light incident surface and a light emergent surface for receiving lights reflected by the mirror with the light incident surface to form images, wherein the transmission screen according to claim 18 is used as the transmission screen.

20. A rear projection monitor comprising a projector for projecting images displayed on an image display apparatus, a reflection mirror for reflecting lights projected from the projector, and a transmission screen having a light incident surface and a light emergent surface for receiving lights reflected by the mirror with the light incident surface to form images, wherein the transmission screen according to claim 1 is used as the transmission screen.

* * * * *